United States Patent [19]
Kotova et al.

[11] 3,855,446

[45] Dec. 17, 1974

[54] DEVICE FOR DIRECTING THE MOVEMENT OF WELDING ELECTRODE ALONG THE BUTT OF JOINING PARTS

[76] Inventors: Valentina Georgievna Kotova, ulitsa V. Vasilievskoi, 17, kv. 89; Gretel Artashesovna Akopian, Bulvar L. Ukrainki, 12, kv. 130; Anatoly Ivanovich Galitsky, ulitsa Serafimovicha, 13a kv. 13; Jury Petrovich Golin, Bulvar Verkhovogo Soveta 94a. kv. 72; Valery Grigorievich Snezhko, ulitsa, 13/14, kv. 64; Leonid Georgievich Kolesnichenko, Obruschskaya ulitsa 13/14, kv. 64; Larisa Akimovna Ivanenko, Brest- Litovsky prospekt, 78. kv. 69; Jury Fedorovich Nekrasov, Polovetskaya ulitsa, 18, kv. 1, all of Kiev, U.S.S.R.

[22] Filed: Nov. 17, 1972

[21] Appl. No.: 307,533

[52] U.S. Cl. ............... 219/125 PL, 219/131 WF
[51] Int. Cl. ............................................. B23k 9/10
[58] Field of Search .......... 219/125 R, 125 PL, 137, 219/131 WF; 250/202

[56] References Cited
UNITED STATES PATENTS

| | | |
|---|---|---|
| 3,017,552 | 1/1962 | Brouwer .............................. 318/39 |
| 3,037,888 | 6/1962 | Lobosco et al. .......... 219/125 PL X |
| 3,124,691 | 3/1964 | Brouwer ............................ 250/202 |
| 3,135,857 | 7/1964 | Von Voros .................... 219/125 PL |
| 3,204,081 | 8/1965 | Iceland ......................... 219/125 PL |
| 3,268,805 | 8/1966 | Normando ........................... 324/37 |
| 3,555,239 | 1/1971 | Kerth ............................. 219/125 R |

Primary Examiner—J. V. Truhe
Assistant Examiner—G. R. Peterson
Attorney, Agent, or Firm—Waters, Roditi, Schwartz & Nissen

[57] ABSTRACT

A device for correcting the position of a welding electrode relative to the joint of parts being welded and to keep in axial relationship the weld seam and the joint, while the seam width is adjusted at the same time. The device has two photoelectric sensors indicating the position of the joint and the seam, and follow-up and control units associated with the sensors. In the course of welding, as the joint moves relative to the electrode, a control signal is generated which aligns the welding electrode with the joint of the parts being welded. In case of industrial interferences, the resulting displacement of the seam axis relative to the joint is corrected by a seam control system. The device is capable of maintaining a constant width of the seam in the course of welding.

5 Claims, 3 Drawing Figures

DEVICE FOR DIRECTING THE MOVEMENT OF WELDING ELECTRODE ALONG THE BUTT OF JOINING PARTS

The present invention relates to the devices used in the automation of welding processes and, more specifically, to the devices for moving the welding electrode along the butt of joining parts.

Devices for directing the movement of welding electrode along the butt of joining parts, comprising various butt position sensors are known. In this devices, a signal from the sensor is brought to the follow-up system which comprises an amplifier-converter and an actuator which through the agency of a speed reducer moves the welding electrode and also the sensor which is rigidly connected to this electrode, along the butt of joining parts. Such embodiment of the device for moving the welding electrode along the butt of joining parts is utilized in a case when a butt position sensor takes the form of butt position electromagnetic sensors.

Application of photoelectric sensors to perform the function of butt position sensors proceeds from their operation along a so called "base" line repeating the shaping of the butt of joining parts and being marked at a certain distance away from the butt. This is often accompanied by the use of a circular scanning photoelectric sensor rigidly connected to the welding electrode and helped with a follow-up system for tracing the movement of this electrode in relation to the "base" line. When the photoelectric sensor is scanning the "base" line, two pulses are taken from the output of the sensor with the distance between them being characterized by the position of the base line in relation to the welding electrode. These pulses are fed to the balanced thyratron system of the follow-up system connected to the drive which moves the welding electrode. The sign and magnitude of current in the armature of the actuator motor are characteristic of the magnitude and direction of the welding electrode movement in relation to the base line.

However, all these devices do not meet the requirements of accuracy and dependability because, first of all, it is not always possible to determine the width of the gap in the butt and consequently to guide the electride along the axis of the butt. Application of the electromagnetic sensors is restricted due to the dependence of sensor indications on the material of parts being welded, also on the material of the back and clamps, and on the height variations of the edges of the parts being welded and their thickness. Application of photoelectric sensors entails marking a base line. Marking the base line parallel to one of the edges of parts being welded makes the device on the whole considerably more complicated and adds additional error to its functioning. Apart from that, a place might not always be available for marking this line and in a number of cases the marking of the line is not possible altogether because this would reduce the strength of the parts being welded. These devices cannot be used for the purpose of following-up along the butt of the parts being welded because their functioning is based on a difference in reflection factors of the base line and of the metal of the parts being welded without accounting for the effects of technological disturbances caused by variations of the gap along the length of the butt, height excess of the edges, their non-uniform heating, etc. As is often practiced, the edges are subject to chemical pickling before welding and then a layer of oxides is removed. Remaining on the surface of the edges due to the above action are longitudinal scratches commensurable to the gap in the butt of the edges which leads to the occurance of interference signals on the output of the photoelectric sensor, or to the distortion of its signal. Besides, technological disturbances occurred during the welding process cause variations in the width of the welding butt and the displacement of the seam axis in relation to the butt axis which generally cannot be eliminated by the known devices.

It is a general object of the present invention to obviate the above disadvantages.

It is a specific object of the present invention to provide a device for directing the movement of welding electrode along the butt of joining parts, wherein a follow-up system would ensure, in the course of welding, the movement of the welding electrode along the butt of joining parts with the coincidence of the seam axis and the butt axis under the simultaneous control of the seam width.

These and other objects are achieved due to the provision of a device for directing the movement of welding electrode along the butt of joining parts, wherein a butt position photoelectric sensor located in the way of the welding process ahead of the welding electrode is rigidly linked with the latter and provided with a follow-up system for tracing the movement of this electrode in relation to the butt of joining parts, according to the invention, the follow-up system for tracing the movement of welding electrode in relation to the butt of joining parts incorporates shapers for negative and positive signals corresponding to the left-hand and right hand positions of the photoelectric sensors in relation to the axis of the butt of joining parts, whereas one inputs of the shapers are connected to the output of the converter for the photoelectric sensor output signal, which converter being connected to said sensor, while other inputs are connected to a synchronizer whose input is also connected to the converter output; an adder, connected to whose corresponding inputs are negative and positive signal shapers, and a control unit of the actuator for moving the welding electrode in relation to the axis of the butt of joining parts, the input of said control unit via an integrater being connected to the adder output, while the output thereof being connected to the actuator linked with the welding electrode.

It is expedient to provide the device with a weld seam position photoelectric sensor located in the way of the welding process behind the welding electrode and rigidly connected to the latter and provided with a follow-up system for tracing the movement of the welding electrode in relation to the weld seam axis, the system being connected to the weld seam position photoelectric sensor. This system of control over the welding electrode movement in relation to the weld seam axis may incorporate additional shapers for negative and positive signals corresponding to the right-hand and left-hand positions of the weld seam position photoelectric sensor in relation to the weld axis, the inputs of said shapers being connected to the output of said photoelectric sensor, while their outputs being connected to the corresponding inputs of an additional adder which in turn is connected to the output of an additional integrator whose outputs are connected to one of the inputs of the coincidence logic circuit, whereas connected to the other input of the latter circuit is an integrator of the follow-up system for tracing the movement of the welding electrode in relation to the butt of joining parts, while the output of the circuit is connected to the welding movement control unit.

The device may incorporate welding current control system comprising seriesly connected to each other a unit for measuring the gap in the butt of joining parts, a welding current correction unit, and a welding current controller, herein the input of the unit for measuring the gap in the butt is connected to the butt position photoelectric sensor, whereas the output of the welding current controller is connected to the welding electrode; a filler wire feeding speed control system comprising seriesly connected to each other a weld seam width measuring unit whose input is connected to the weld seam position photoelectric sensor, a filler wire feed speed correction unit, and a filler wire feed speed controller whose output is connected to the welding electrode.

It is desirable that the device incorporates a welding electrode movement inhibitor unit whose input is connected to the follow-up system for tracing the movement of the welding electrode in relation to the butt of joining parts, while the output thereof is connected to the unit for controlling the welding electrode movement in relation to the weld seam, to the welding current control system, to the filler wire speed control system, and to the follow-up system for tracing the welding electrode movement.

This welding electrode movement inhibitor unit should incorporate seriesly connected to each other a flip-flop unit, an OR logic circuit, an inhibit flip-flop, and a control key, whereas the input of the flip-flop unit and other inputs of the OR logic circuit are connected to the outputs of the corresponding negative and positive signal shapers of the follow-up system for tracing the welding electrode movement, one more inputs of the inhibit flip-flop is connected to the output of the synchronizer of the same follow-up system, while the output of the control key is connected to the input of the follow-up system adder, to the input of the additional adder of the control system for tracing the welding electrode movement in relation to the weld seam axis, to the input of the welding current correction unit of the welding current control system, and to the input of the filler wire feed speed correction unit of the filler wire feed speed control system.

In order that the invention may be more clearly understood an actual embodiment of a device for directing the movement of welding electrode along the butt of joining parts will now be fully described with reference to the accompanying drawings in which.

Figure 1:
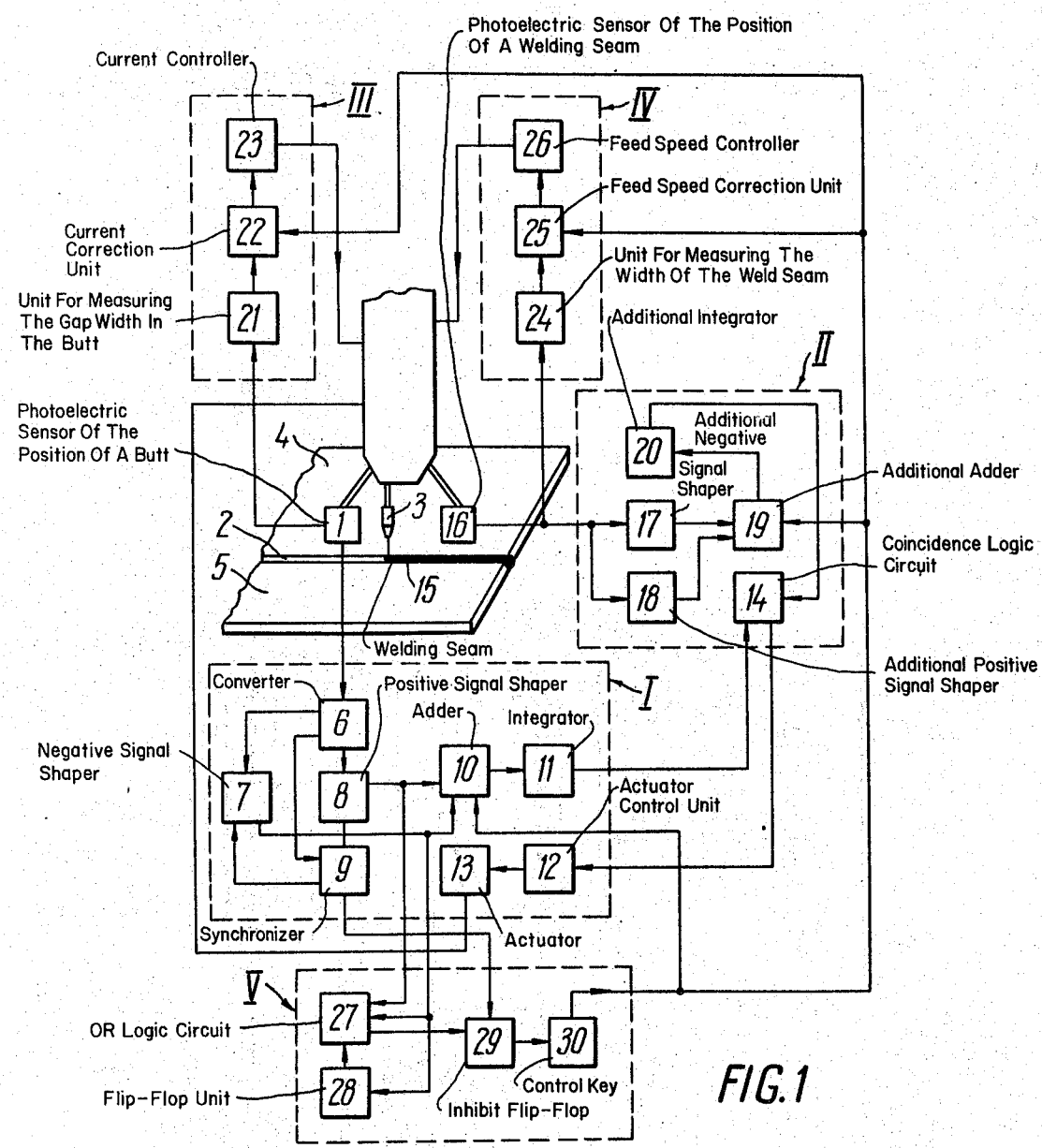
FIG. 1 is a general block diagram of a device for directing the movement of the welding electrode along the butt of joining parts, according to the invention.

A device for directing the movement of the welding electrode along the butt of joining parts, according to the invention, comprises: a photoelectric sensor 1 (FIG. 1) for sensing the position of a butt 2, the sensor being rigidly connected to a welding electrode 3 and located ahead of the latter in the way of the welding process, and a follow-up system 1 for tracing the movement of this electrode 3 in relation to the axis of the butt 2 of parts 4 and 5 being joined.

The follow-up system 1 for tracing the movement of the welding electrode 3 in relation to the butt 2 of the parts 4 and 5 being joined, includes in turn a converter 6 for the output signal of the photoelectric sensor 1, shapers 7 and 8 of negative and positive signals corresponding to the right-hand and left-hand positions of the photoelectric sensor 1 in relation to the butt 2, a synchronizer 9, an adder 10, an integrator 11, a control unit 12 of the actuator 13 for moving the welding electrode 3 in relation to the axis of the butt 2 of the parts 4 and being joined.

The photoelectric sensor 1 for sensing the position of the butt 2 is installed above the butt 2 of the parts 4 and 5 being joined and consists of a projecting and a receiving systems (here and further now shown). The projecting system casts a light spot to a small area of the butt 2 being visualized, whereas a movable and a fixed diaphragms are installed in the image plane of the objective of the receiving system. The fixed diaphragm with a segment opening determines the field of vision of the photoelectric sensor 1. The movable diaphragm with a slot opening, when rotated, passes a light flux to a photosensitive element of the photoelectric sensor 1, said element developing an output signal of the photoelectric sensor 1. The photoelectric sensor 1 for sensing the position of the butt 2 is connected to the input of the converter 6 for the output signal of the photoelectric sensor 1, the output of the converter is connected to the inputs of the negative signal shaper 7 and the positive signal shaper 8 and of the synchronizer 9. The output of this synchronizer 9 is connected to other inputs of the shapers 7 and 8, while the output of each negative and positive signal shaper 7 and 8 is connected to the corresponding input of the adder 10. The output of the adder 10 is connected to the integrator 11 and via a coincidence logic circuit 14 of the system II to control the movement of the welding electrode 3 is connected to the input of the unit 12, which controls the actuator 13 and the output of the logic circuit 14. The output of the control unit 12 is connected to the actuator 13 for moving the welding electrode 3 in relation to the axis of the butt 2 of the parts 4 and 5 being joined.

To obtain a higher quality weld seam 15, that is to eliminate the non-coincidence of the axis of the butt 2 and the axis of the seam 15 in case of technological disturbances taking place in the course of welding, the device for moving the welding electrode 3 along the butt 2 of parts 4 and 5 being joined also incorporates a photoelectric sensor 16 for sensing the position of the seam 15, and a system II to control the movement of the welding electrode 3 in relation to the axis of the weld seam 15.

The system II to control the movement of the welding electrode 3 in relation to the axis of the weld seam 15 incorporates in turn additional signal shapers, negative 17 and positive 18, corresponding to the right-hand and left-hand positions of said photoelectric sensor 16 in relation to the axis of the weld seam 15, also an additional adder 19, an additional integrator 20, and said coincidence logic circuit 14.

The photoelectric sensor 16 for sensing the position of the seam 15 is rigidly connected to the electrode 3 and located behind the latter in the way of the welding process. The output of this photoelectric sensor 13 is connected to the input of the additional signal shapers, positive 18 and negative 17, whose outputs are connected to the input of the additional adder 19. The output of the additional adder 19 communicates with the additional integrator 20 which is connected to the input of the coincidence logic circuit 14. At an error signal, corresponding to the displacement of the axis of the seam 15 in relation to the axis of the butt 2, the coincidence logic circuit 14 connects the system II to control the movement of the welding electrode 3 in relation to the axis of the weld seam 15, to the input of the unit 12 which controls the actuator 13 for moving the welding electrode 3 in relation to the axis of the butt 2 of parts 4 and 5 being joined.

Besides, the device of the invention, to maintain the constant width of the weld seam 15, is adapted, in the course of welding, to correct welding current and the filler wire feed speed (said wire not shown). To this end, the device is provided with a welding current control system III and a filler wire feed speed control system IV.

In turn, the welding current control system III incorporates a unit 21 for measuring the gap width in the butt 2, a welding current correction unit 22, and a welding current controller 23 which are seriesly connected to each other. The output of the photoelectric sensor 1 for sensing the position of the butt 2 is connected to the input of the unit 21 for measuring the gap width in the gap 2. The output of the controller 23 is connected to the welding electrode 3.

The filler wire feed speed control system comprises a unit 24 for measuring the width of the weld seam 15, a filler wire feed speed correction unit 25 and a filler wire feed speed controller 26 which are seriesly connected to each other.

The output of the photoelectric sensor 16 of the position of the seam 15 is connected to the input of the unit 24 for measuring the width of the weld seam 15. The output of the controller 26 is connected to the welding electrode 3.

To prevent disturbed functioning of the device in moving the welding electrode 3 along the axis of the butt 2 of joining parts 4 and 5 in case of external interference and if welding is performed with additional clamps (also not shown), provision is made for an inhibitor unit V. The inhibitor unit V incorporates an OR logic circuit 27, a flip-flop unit 28 with a counting input, an inhibit flip-flop 29, and a control key 30. The inputs of the OR logic circuit 27 are connected to the output of the flip-flop unit 28 and to corresponding outputs of the signal shapers, negative 7 and positive 8, of the follow-up system 1 for tracing the movement of the welding electrode 3 in relation to the butt 2 of parts 4 and 5 being joined. The output of the OR logic circuit 27 and the output of the synchronizer 9 are connected to the corresponding inputs of the inhibit flip-flop 29.

The output of the inhibit flip-flop 29 is connected to the input of the control key 30.

Figure 2:
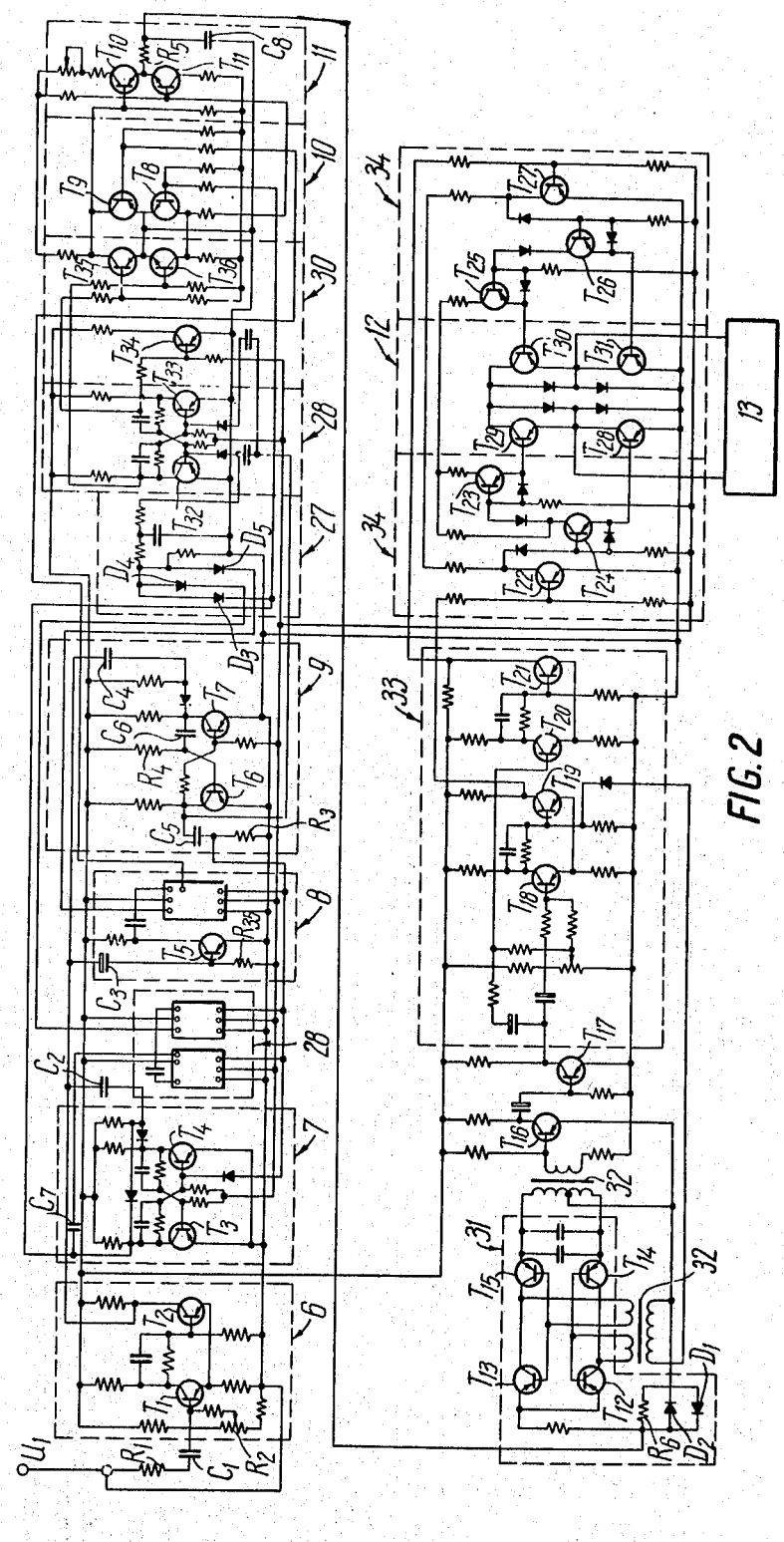
FIG. 2 is an elementary diagram of a follow-up system for directing the welding electrode movement along the butt of joining parts, according to the invention.

The basic circuit of the follow-up system for tracing the welding electrode movement in relation to the axis of the butt of parts being joined is as follows. The output of the photoelectric sensor 1 (FIG. 1) of the position of the butt 2 is connected via resistor R1 and capacitor C1 (FIG. 2) to the converter 6 (FIG. 1) for the output signal of the photoelectric sensor 1. The converter is based on Schmitt circuitry utilizing transistors T1 and T2 (FIG. 2). Variable resistor R2 (FIG. 2) is used to control the level of the input signal of the sensor 1 (FIG. 1). The output of the converter 6 via capacitor C2 (FIG. 2) is connected to the input of the negative signal shaper 7 (FIG. 1). The shaper 7 is based on a symmetric flip-flop circuitry with triodes T3 and T4 (FIG. 2). The converter 6 via capacitor C3 and a matching stage based on triode T5 is connected to the positive signal shaper 8 (FIG. 1) also based on a symmetric flip-flop circuitry similar to the negative signal shaper 7.

The output of the converter 6 for the output signal of the photoelectric sensor 1 via capacitor C4 (FIG. 2) is connected to the synchronizer 9 based on a non-symmetric flip-flop circuitry with transistors T6 and T7 (FIG. 2), while the output of the synchronizer 9 (FIG. 1) via a differentiating circuit: capacitor C5 (FIG. 2) - resistor R3 is connected to other inputs of the shapers 7 and 8 and to the inhibitor unit V. Duration of the pulse shaped by the synchronizer 9 is controlled by means of resistor R4 (FIG. 2) and capacitor C6. The output of the negative signal shaper 7 is connected to the adder 10 (FIG. 1) and via capacitor C7 (FIG. 2) is connected to the flip-flop unit 28 with the counting input (FIG. 1). The outputs of signal shapers, negative 7 and positive 8, are connected to the input of the adder 10 and to the OR logic circuit 27 of the inhibitor unit V. The adder 10 is formed of the control keys based on transistors T8, T9 (FIG. 2) connected to whose output are the control keys of the integrator 11. The latter keys are based on transistors T10, T11 with the integrating circuit R5-C8 connected to the latter. The output of the integrating circuit is connected to the input of a half-wave modulator 31 of the control unit 12 (FIG. 1) of the actuator 13 via diode limiters D1D2 (FIG. 2) and resistor R6. The half-wave modulator 31 incorporates two keys which are based correspondingly on transformers 32 and transistors T12, T13 and T14, T15. The output of the modulator 31 is connected to an amplifier based on transistors T16 and T17. The output of the amplifier in turn is connected to the inputs of non-symmetric flip-flops of another modulator 33. The flip-flops are based on transistors T18, T19 and T20, T21. Other inputs of the same flip-flops are powered in the opposite phase, whereas their output via keys 34 based on transistors T22-T27 is connected to the input of the control unit 12 (FIG. 1) of the actuator 13 for the lateral movement of the welding electrode 3. The control unit 12 (FIG. 2) features a bridge circuit based on transistors T28-T31 (FIG. 2), while the output of this circuit is connected to the armature (not shown) of the actuator 13 (FIG. 1) for the lateral movement of the welding electrode 3.

The output of the negative signal shaper 7 is connected to the flip-flop unit 28. The flip-flops of this unit are seriesly connected to each other and are circuited similar to the negative signal shaper 7. The output of the flip-flop unit 28 together with the outputs of signal shapers, positive 8 and negative 7, are connected to the outputs of the OR logic circuit 27. The OR circuit 27 is based on diodes D3, D4, D5 (FIG. 2). The output of the OR circuit 27 is connected to one input of the inhibit flip-flop 29. The inhibit flip-flop 29 is based on transistors T32 and T33. The output of the inhibit flip-flop 29 (FIG. 1) is connected to the control key 30 which is based on transistors T34–T36 (FIG. 2) whose output is connected to the circuit of the adder 10.

A device for directing the movement of the welding electrode along the butt of parts being joined functions as follows.

Figure 3:
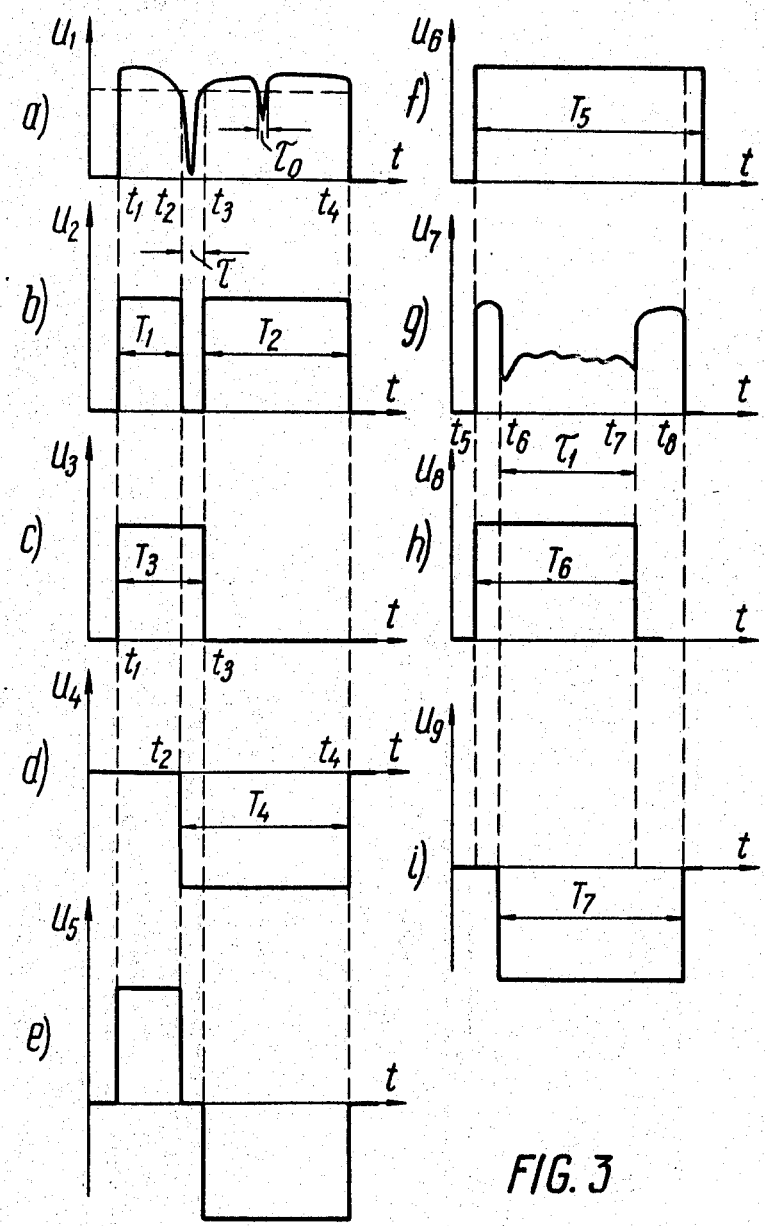
FIG. 3 ($a,b,c,d,e,f,h,i$) - time diagrams for signals passing across the outputs for separate units of a device according to the invention.

The photoelectric sensor 1 of the position of the butt 2 is scanning the surface to be welded ahead of the welding electrode 3 in the way of its movement and produces information about the position of the butt 2 of parts being joined in relation to the optical axis of this photoelectric sensor 1 and consequrently in relation to the welding electrode 3. An output signal $U_1$ (FIG. 3a) from the photoelectric sensor 1 (FIG. 1) is converted by the converter 6 into a succession of rectangular pulses $U_2$ (FIG. 3b) whose duration T corresponds to the field of vision of the photoelectric sensor 1 (FIG. 1). The frequency rate of these pulses corresponds to the rotation speed of the scanning disc in the photoelectric sensor 1. When the butt 2 comes in the field of vision of the photoelectric sensor 1, an output pulse produced by the converter 6 is divided into two pulses $T_1$ and $T_2$ (FIG. 3b). Duration $\tau$ of the interval between the pulses corresponds to the width of the gap in the butt 2 (FIG. 1). The duration of each pulse $T_1$ and $T_2$ (FIG. 3b) characterizes the diversion of the butt 2 in relation to the optical axis of the photoelectric sensor 1 (FIG. 1). At the coincidence of the optical axis of the photoelectric sensor 1 and the axis of the butt 2 the duration of these pulses $T_1$ and $T_2$ (FIG. 3b) are equal. An output signal from the converter 6 (FIG. 1) enters the inputs of the signal shapers, positive 8 and negative 7, which are shaping accordingly positive pulse $U_3$ (FIG. 3c) and negative pulse $U_4$ (FIG. 3d). The leading edge of positive pulse $U_3$ (FIG. 3c) at instant $t_1$ coincides with the leading edge of pulse $U_2$ (FIG. 3b) of the field of vision of the photoelectric sensor locating the position of the butt 2 (FIG. 1), while the trailing edge of positive pulse $U_3$ (FIG. 3c) corresponding to instant $t_3$ coincides with the trailing edge of butt pulse $U_2$ (FIG. 3b). The front edge of negative pulse $U_4$ (FIG. 3d) corresponding to instant $t_2$ coincides with the leading edge of butt pulse $U_2$ (FIG. 3b), whereas the trailing edge thereof corresponding to instant $t_4$ coincide with the trailing edge of pulse $U_2$ (FIG. 3b) of the field of vision. To prevent disturbed functioning of the device in case of disappearing the butt pulse or in case of interference the synchronizer 9 (FIG. 1) whose input is fed with shaped pulses $U_3$ and $U_4$ (FIGS. 3c and d), returns the signal shapers, negative 7 (FIG. 1) and positive 8, to the initial condition. Duration $T_5$ (FIG. 3f) of the pulse of the synchronizer 9 (FIG. 1) is longer than duration $T_0$ of pulse $U_2$ (FIG. 3b) of the field of vision of the photoelectric sensor 1. Shaped pulses $U_3$ and $U_4$ (FIGS. 3c and d) are added up in the adder 10 (FIG. 1) and signal $U_5$ is taken from the output of the latter adder. This signal $U_5$ is converted in the integrator 11 (FIG. 1) into direct-current voltage whose sign corresponds to the polarity of a longer pulse. This determines the direction of the movement of the electrode 3 in relation to the axis of the photoelectric sensor 1. A mismatching signal from the integrator 11 is brought to the control unit 12 of the actuator 13 for moving the welding electrode 3 along the axis of the butt 2. This control unit 12 depending on the polarity of the mismatching signal shifts the actuator 13 of the welding electrode movement in the required direction in relation to the axis of the butt 2. If, in the course of welding, the axis of the seam 15 deviates in relation to the axis of the butt 2 a quality weld seam is obtained by activating the system II which controls the movement of the welding electrode 3 in relation to the weld seam 15.

The photoelectric sensor 16 of the position of the seam 15 is located behind the welding electrode 3 and scans the weld seam 15 within its field of vision. The optical axes of the photoelectric sensors 16 and 1 of the position of the seam 15 and the butt 2 are made coincided. Output signal $U_7$ (FIG. 3g) of the photoelectric sensor 16 of the position of the seam 15 includes information about width $F_1$ (FIG. 3g) of the weld seam 15 and about its position in relation to the axis of the butt 2 (FIG. 1) of parts 4 and 5 being joined. This signal $U_7$ (FIG. 3g) is cut off given noise level across the input of the photoelectric sensor 1 (FIG. 1) and brough to the corresponding inlets of the additional signal shapers, negative 17 and positive 18. The additional shaper 18 generates pulses $U_8$ (FIG. 3h) of the positive polarity and of duration $T_6$ corresponding to time interval $t_5$–$t_7$. The additional shaper 17 (FIG. 1) generates pulses $U_9$ (FIG. 3i) of the negative polarity and of duration $t_7$ corresponding to time interval $t_6$–$t_8$. From the output of the additional shapers 17 and 18, pulses $U_8$ and $U_9$ (FIG. 3h and i) come across the input of the additional adder 19 (FIG. 1) and the integrator 20. Originated at the output of the integrator 20 is a mismatching signal which is proportional to the difference of duration $T_6$ and $T_7$ of pulses $U_8$ and $U_9$ (FIG. 3h and i). is direct-current voltage whose polarity corresponds to a longer pulse. This mismatching signal enters the coincidence logic circuit 14 (FIG. 1). The circuit 14 blocks feeding an output signal from the follow-up system 1 for tracing the movement of the welding electrode 3 in relation to the axis of the butt 2 of parts 4 and 5 being joined, to the control unit 12 of the actuator 13 which moves the welding electrode 3. The control unit 12 is given a control directive from the system II which controls the movement of the welding electrode 3 in relation to the axis of the seam 15 and therefore the electrode is shifted in the direction ensuring the symmetric weld penetration of the seam 15 in relation to the axis of the butt until a mismatching signal disappears from this control system II. The coincidence logic circuit 14 will again start passing a mismatching signal of the follow-up system for tracing the movement of the welding electrode 3 in relation to the axis of the butt 2 of joining parts 4 and 5 to the control unit 12 of the actuator 13 which moved the welding electrode 3. The welding electrode 3 is now again moved along the axis of the butt 2 of parts 4 and 5 being joined.

It has been stated above that the device of the invention is also made adaptable to correcting the welding current and the filler wire feed speed depending on the variation of the gap in the butt 2 and the width of the seam 15. To this end, output signal $U_1$ (FIG. 3a) of the photoelectric sensor 1 (FIG. 1) of the position of the butt 2 is brought to the input of the unit 21 for measuring the width of the gap in the butt 2, which separates a butt signal from the output signal of the photoelectric sensor 1 and feeds it to the welding current correction unit 22. The output signal of the welding current correction unit 22, which is proportional to the width of the gap enters the welding current controller 23. This welding current controller 23 corrects the welding current depending on the variation of the gap in the butt 2 of parts 4 and 5 being joined. The unit 24 for measuring the width of the seam 15, connected to the output of the photoelectric sensor 16 of the position of the seam 15, separates from the output signal of the photoelectric sensor 16 of the position of the seam 15, a pulse proportional to the width of the seam 15 and feeds it to the filler wire feed speed correction unit 25. This filler wire feed speed correction unit 25 develops a control directive for the filler wire feed speed controller 26 depending on the variation of the width of the seam 15 in relation to the given value.

For reliable functioning of the device in case of interference or when operating with clamps which may lead to false operation of the system and to the diversion of the welding electrode 3 away from the axis of the butt 2, the device of the invention is provided with an inhibitor unit V.

In case of interference to present in output signal $U_1$ (FIG. a) of the photoelectric sensor 1 (FIG. 1) of the position of the butt 2, interference pulses apart from the butt pulse may appear which are also formed by the pulse shapers, negative 7 and positive 8, and counted by the flip-flop unit 28. The output signal from the flip-flop unit 28 enters the OR logic circuit 27 together with shaped pulses $U_3$ and $U_4$ (FIG. 3c and d) from the pulse shapers, negative 7 (FIG. 1) and positive 8. A potential is formed on the output of the OR circuit 27 and is fed to one of the inputs of the inhibitor flip-flop 29. The output of the inhibitor flip-flop 29 is connected to the control key 30 which at acting of the flip-flop 29 shunts signals coming to the adder 10 and the integrator 11 of the follow-up system 1 for tracing the movement of the welding electrode 3 in relation to the butt 2 of parts 4 and 5 being joined. Due to the above, action of the inhibit flip-flop 29 cuts off coming of signals to the control unit 12 of the actuator 13 for moving the welding electrode 3 along the butt 2, and the welding electrode 3 is therefore moved in the preset direction during the life of interference. Besides, the output signal of the inhibit flip-flop 29 comes to the welding current correction unit 22 and blocks the delivery of its output signal to the input of the welding current controller 23 thus, excluding a possibility of false alteration of the welding current with inteference present in the output signal of the photoelectric sensor 1 of the position of the butt 2.

With interference signal present in the output signal of the photoelectric sensor 16 of the position of the seam 15, the outputs of the additional shapers 17 and 18 are also connected to the inhibitor unit III (this connection is not shown in FIG. 1). The output signal of the inhibitor unit III blocks transfer of the control action from the filler wire feed speed correction unit 25 to the filler wire feed speed controller.

Now, proceeding to the successive passing of the signal through the elementary circuit (FIG. 2) of the follow-up system for tracing the movement of the welding electrode 3 along the axis of the butt 2 of parts 4 and 5 being joined.

The output signal from the photoelectric sensor 1 entering the input of the converter 6 (FIG. 2) makes the latter acting and a rectangular pulse $U_2$ (FIG. 3b) is thus taken from its output. The duration T of this pulse corresponds to the field of vision of the photoelectric sensor 1 (FIG. 1). The pulse is divided by a butt pulse, whose duration $\tau$ (FIG. 3b) corresponds to the width of the gap in the butt 2 (FIG. 1) into two pulses. The duration of these pulses $T_1$ and $T_2$ (FIG. 3b) corresponds to the diversion of the axis of the butt 2 (FIG. 1) of the photoelectric sensor 1 in relation to the electrode 3. The pulse $U_2$ (FIG. 3b) with its leading edge corresponding to the instance t activates the symmetric flip-flop of the positive signal shaper 8 and returns it to the initial condition by the trailing edge of the butt pulse corresponding to the instance $t_3$. So, a positive voltage pulse $U_3$ (FIG. 3c) of duration $T_1$ is generated on the output of the shaper 8.

The leading edge of the butt pulse of duration $\tau$ (FIG. 3b) is differentiated by a circuit $C_3R_{35}$ and turned in phase by a stage based on transistor $T_5$ (FIG. 2) and further activates the negative pulse shaper 7 which when returning to the initial position forms a negative pulse $U_4$ (FIG. 3d) on its output by the trailing edge of the pulse $U_2$ (FIG. b) of the field of vision of the photoelectric sensor 1 (FIG. 1). Apart from that, the output signal $U_2$ (FIG. 3b) by its leading edge corresponding to the instant $t_1$ activates the synchronizer 9 (FIG. 2) which generates pulses $U_6$ (FIG. 3f) whose duration is longer than the duration T of the pulse $U_2$ (FIG. 3b) of the field of vision of the photoelectric sensor 1 (FIG. 1), $T_5 \geqslant T$. The output pulses $U_6$ (FIG. 3f) of the synchronizer 9 (FIG. 2) are differentiated by a circuit $C_5R_3$ and upon entering the inputs of the signal shapers, negative 7 and positive 8, return the shapers to the initial position, if upon ending of the pulse $U_2$ (FIG. 3b) of the field of vision the shapers 7 and 8 were not returned to the initial position. Shaped pulses $U_3$ (FIG. 3c) and $U_4$ (FIG. 3d) of the signals shapers, positive 8 (FIG. 2) and negative 7, enter the inputs of the adder 10 and the integrator 11. Established on the output of the integrating circuit $R_5C_8$ of the integrator 11 is a direct-current voltage whose value is proportional to the difference between the duration of pulses $U_5$ (FIG. 3e) of the signal shapers, negative 7 (FIG. 2) and positive 8. Its polarity corresponds to that of a longer pulse. A mismatching signal from the integrator 11 when passing through diode limiters $D_1$, $D_2$ (FIG. 2) are converted by the half-wave modulator 31 into alternating-current voltage and fed to the non-symmetric flip-flops 33 of the modulator 31. These flip-flops 33 are controlled by the alternating-current voltage which is delivered in the opposite phase to other inputs of the flip-flops 33. Depending on the polarity of the mismatching signal, one of the flip-flops 33 of the modulator 31 comes to act and products a corresponding signal to the control unit 12 (FIG. 1) of the actuator 13 for moving the welding electrode 3 in relation to the axis of the butt 2. The output signal of the flip-flop 33 (FIG. 2) of the modulator 31 comes across the control keys 34 and blocks or unblocks the transistors $T_{28}$ and $T_{31}$, thus connecting the motor of the actuator 13 (FIG. 1) to a power source (not shown). The actuator 13 moves the electrode 3 until an error signal becomes less than the dead band of the control unit 12.

With intereference present in the field of the photoelectric sensor 1 or if no signal of the butt is available, the signal shapers, negative 7 and positive 8, are forming excess pulses, i.e., information about the interference. These pulses are brought to the keys of the adder 10 and transformed into other than zero voltage which may cause activation of the actuator 13, and the welding electrode 3 may therefore deviate aside of the axis of the butt 2. To prevent the above, provision is made for the inhibitor unit V which cuts off delivery of output pulses from the signal shapers, negative 7 and positive 8, to the adder 10 and the integrator 11.

Cutting-off control of the signal from the integrator 11 is performed by the inhibitor flip-flop 29 (FIG. 2). The inhibitor flip-flop 29 is operated by the input signals of the OR logic circuit 27 with simultaneous entering its inputs by the signals from the signal shapers, negative 7 and positive 8, and from the flip-flop unit 28 when no butt pulse is present in the field of vision of the photoelectric sensor 1 or when interference pulses are present. The output signal of the inhibitor flip-flop 29 blocks the keys (transistors $T_8$, $T_9$) of the adder 10 which are shunting the delivery of the output signal of the adder 10 to the integrator 11. This is accompanied by discharging the capacitor $C_8$ of the integrator 11 through the circuit at a short time constant. A mismatching signal is not delivered to the control unit 12 of the actuator 13 for moving the welding electrode 3 in relation to the axis of the butt 2. The welding electrode 3 is moved in the earlier preset direction until an interference signal disappears from the output of the photoelectric sensor 1. The inhibit flip-flop 29 returns to the initial position and a mismatching signal proportional to a difference between the durations of pulses generated by the pulse shapers, negative 7 and positive 8, enters the control unit 12 of the actuator 13 for moving the welding electrode 3 in relation to the axis of the butt 2.

The device for moving the welding electrode along the butt of the parts being joined ensures orienting of the welding electrode in relation to the butt of the parts being joined with the coincidence of the butt axis and the axis of the weld seam under simultaneous control over the seam width.

This device is adapted for inert-gas welding with consumable and nonconsumable electrodes of parts made of various materials and practically of any thickness. The device is suitable for welding straight-line, girth and circular joints and it keeps well operable when clamps are used and technological disturbances appear in the course of welding. Permissible height excess of the edges of joining parts is up to 8 mm. Application of the device is possible with the gap width variance along the length of the butt within the limits of from 0 to 10 mm. Tracking accuracy along the butt axis is "0.2 mm. The welding current may be direct, alternating, or pulsating.

Application of the device for moving the welding electrode along the butt of parts being joined increases labour productivity, improves the weld seam quality and provides better weldor's working conditions.

We claim:

1. A device for directing the movement of a welding electrode along the joint of parts being welded, comprising:

a first photoelectric sensor indicating the position of said joint and located along the path of the welding process ahead of said welding electrode, the position of said first sensor corresponding to a predetermined position of the electrode;

a follow-up system for tracing the direction of movement of said welding electrode relative to said joint of said parts being welded, said system being connected to said sensor;

a converter in said follow-up system to convert the output signal of said photoelectric sensor into a train of rectangular pulses, the input of said converter being connected to the output of said photoelectric sensor;

a negative signal wave shaper in said follow-up system corresponding to the right-hand position of said photoelectric sensor relative to the axis of said joint of said parts being welded, when viewed in the direction of the welding process, the input of said shaper being connected to the output of said converter;

a positive signal wave shaper in said follow-up system, corresponding to the left-hand position of said photoelectric sensor relative to the axis of said joint of said parts being welded, when viewed in the direction of the welding process, the input of said shaper being connected to the output of said converter;

a synchronizer in said follow-up system and having an input connected to said output of said converter, the output of said synchronizer being connected, respectively, to the other inputs of said positive and negative signal shapers;

an adder in said follow-up system and having inputs connected to respective outputs of said positive and negative signal shapers;

an integrator in said follow-up system and having an input connected to the output of said adder;

a second photoelectric sensor indicating the position of the weld seam and arranged behind said electrode when viewed in the direction of the welding process, said second photoelectric sensor being rigidly connected to said electrode;

a control system to control the movement of said welding electrode relative to the axis of said weld seam, said control system being connected to said second photoelectric sensor indicating the position of the weld seam;

auxiliary wave shapers in said control system to shape positive and negative signals corresponding to the right-hand and left-hand positions of said second photoelectric weld seam position sensor relative to the axis of the weld seam when viewed in the direction of the welding process, the inputs of said auxiliary shapers being connected to the output of said second photoelectric weld seam position sensor;

an auxiliary adder in said control system and having inputs connected to respective outputs of said auxiliary shapers;

an auxiliary integrator in said control system and having an input connected to the output of said auxiliary adder;

a logic coincidence circuit in said control system and having a first input connected to the output of said auxiliary integrator and having a second input connected to the output of said integrator in said follow-up system;

actuating means in said follow-up system, for moving said welding electrode;

a control unit to control said actuating means and having an input connected to the output of said logic coincidence circuit, the output of said control unit being connected to the input of said actuating means.

2. A device as claimed in claim 1, including an inhibiting unit to inhibit the movement of the welding electrode relative to the axis of said joint, said unit comprising:

a flip-flop with input connected to the output of said negative signal shaper in said follow-up system for tracing the direction of movement of said welding electrode;

a logic OR circuit having one input connected to the output of said flip-flop, and having a second input connected to the output of said negative signal shaper in said follow-up system for tracing the direction of movement of the welding electrode, said OR circuit having a third input connected to the output of said positive signal shaper in said follow-up system;

an inhibiting flip-flop having one input connected to the output of said logic OR circuit, and having another input connected to the output of said synchronizer in the same follow-up system;

a control key with input connected to the output of said inhibiting flip-flop, the output of said control key being connected to the input of said adder in said follow-up system tracing the direction of movement of said welding electrode along the joint of the parts being welded, the output of said control key being also connected to the input of said auxiliary adder in said control system for controlling the movement of the welding electrode relative to the axis of said seam.

3. A device as claimed in claim 1, including a welding current control system comprising:

a measuring unit for measuring the width of the joint of said parts being welded, the input of said measuring unit being connected to the output of said first photoelectric joint position sensor;

a welding current correction unit with input connected to the output of said unit for measuring the width of the joint;

a welding current controller with input connected to the output of said welding current correction unit, the output signal of said welding current controller correcting the welding current of said welding electrode.

4. A device as claimed in claim 2, including a control system to control the feed speed of filler wire, comprising:

a weld seam width measuring unit with input connected to said second photoelectric weld seam position sensor;

a correction unit to correct the feed speed of said filler wire, the input of said correction unit being connected to the output of said weld seam width measuring unit;

a filler wire feed speed controller with input connected to the output of said correction unit to correct the feed speed of the filler wire, the output signal of said filler wire feed speed controller correcting the feed speed of said welding electrode.

5. A device as claimed in claim 4, wherein the output of said control key of said inhibiting unit is connected to the input of said welding current correction unit and to the input of said correction unit of said control system to correct the feed speed of said filler wire.

* * * * *